United States Patent Office 3,389,116
Patented June 18, 1968

3,389,116
METAL PIGMENT AND METHOD
OF MAKING SAME
Arthur William Saha, Kenilworth, N.J., assignor to Alcan
Metal Powders, Inc., a corporation of Delaware
No Drawing. Filed Aug. 17, 1965, Ser. No. 480,508
9 Claims. (Cl. 260—37)

ABSTRACT OF THE DISCLOSURE

In procedure for rendering metal pigment powder sufficiently electrically non-conductive to enable use of the same in paints applied by electrostatic spraying, the steps of establishing a slurry of the metal powder in hydrocarbon solvent, mixing with the slurry an amount of n-(trimethoxysilylpropyl) ethylenediamine equal to between about 1% and about 5% of the weight of metal powder in the slurry, and stirring the slurry for a period of time sufficient to establish on the powder metal an electrically insulating surface coating of the silane.

---

The product of this procedure is a metal pigment powder having thereon a surface coating of polymerized n-(trimethoxysilylpropyl) ethylenediamine in an amount equal to about 1% and about 5% of the weight of the powder.

This invention relates to metal pigments. More particularly, it is directed to metal pigment products suitable for application, in paints or like surface-coating compositions, by so-called electrostatic spraying, and to a method of treating metal pigments to produce such product. In an important specific aspect, the invention concerns the treatment of aluminum pigment for application (in paint or other vehicle) by electrostatic spraying.

Means and procedures for electrostatic spraying of paint are well known in the art and widely used for coating many types of articles. In such operation the particles of paint, projected from a spray gun in the form of an atomized spray, are given a high electrical charge as or before they are atomized; this process involves subjecting the paint or its particles to an electrostatic field of very high voltage established between the spray gun and the article to be coated, which is maintained at ground potential. Atomization of the paint may be effected either in some conventional manner, e.g. with a current of compressed air, or at least partially by the electrostatic field itself.

Electrostatic spraying provides important advantages with respect to economy of paint consumption and rapidity and facility of application owing to the fact that the charge imparted to the paint droplets causes them to be urged or attracted toward the article to be coated. As will be appreciated, in ordinary paint spraying the atomized paint droplets are dispersed from the spray gun in diverging paths, with the result the substantial quantities of paint may overshoot or miss the target and be lost as "overspray"; in addition, only those portions of the target directly exposed to the spray gun receive any significant amounts of paint. With electrostatic spraying, the attraction of the charged paint droplets to the target article greatly reduces paint loss due to overspray (while concomitantly enhancing cleanliness of operation), and also provides a "wrap-around" effect, i.e. in many instances the paint even coats surfaces of the article facing away from the spray gun thereby reducing total painting time—these and other advantages being familiar to those skilled in the art.

It would be desirable for various purposes to employ electrostatic spray techniques for application of paints or other coating compositions containing metal pigments. Metal pigments, ordinarily comprising metal powders in the form of minute flakes, are widely used in inks, paints and the like, i.e. in dispersion in a suitable film-forming vehicle to provide a protective or decorative surface-coating composition. Examples of such flake metal powders are aluminum pigments and so-called "gold bronze" powders, the latter being flake powders of copper or of copper-zinc or copper-zinc-aluminum alloy with as much as 30% zinc and as much as 3% aluminum. Paints containing aluminum pigments in particular have many present uses in which application by electrostatic spraying would provide significant advantages including those noted generally above.

The attainment of these advantages in the electrostatic spray application of paints containing metallic pigments such as aluminum has, however, heretofore been greatly limited by the fact that the presence of the metal in the paint tends to make the paint too conductive for successful electrostatic spraying. Stated with reference to aluminum pigments, it is found that ordinary aluminum flake powder in paint medium has a breakdown voltage sufficiently low to cause electrostatic breakdown of the paint to occur, with resultant conduction through the metal particles, under the high applied voltage in electrostatic spray operation. Such breakdown obviously prevents use of the paint in electrostatic spraying. As measured by appropriate test procedures hereinafter further described, it appears that a material is in many cases unsuitable for such operation if it breaks down at voltages substantially less than 50,000 volts, although pigments having somewhat lower breakdown voltages, e.g. of the order of about 25,000 volts, would have improved utility for electrostatic spraying as contrasted with ordinary aluminum pigment which usually breaks down at about 20,000 volts or less. That is to say, whereas for many ordinary uses aluminum pigment is considered non-conductive, e.g. with respect to voltages in ordinary current supply systems, nevertheless at the extremely high voltages of electrostatic spraying presence of aluminum pigment in a paint serves to render the paint composition conductive at aluminum flake concentrations in excess of 3 ounces per gallon, and frequently formulations as high as 1.5 lb./gal. would beneficially be applied in electrostatic spraying.

The present invention embraces the discovery that the aforementioned difficulties can be very effectively overcome, and flake metal pigments rendered adequately non-conductive for use in electrostatic spraying at the applied voltages encountered in such operation, by treating the metal pigment with n-(trimethoxysilylpropyl)ethylenediamine, which is a polyaminoalkylsilane having the formula

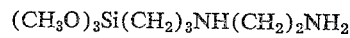

and also sometimes known as N-β-aminoethyl-γ aminopropyltrimethoxysilane. This compound (which is commercially available from Dow-Corning Corporation under the designation Dow-Corning Z-6020 silane) is an ambifunctional silane, i.e. it has both a silicon-functional and an organic-functional group; in addition, it exhibits the property of polymerizing upon addition of water. Its physical form is liquid at room temperature.

Specifically, in the presently preferred practice of the present method the metal pigment to be treated is established in a slurry in a hydrocarbon solvent (for example mineral spirits) and n-(trimethoxysilylpropyl)ethylenediamine, in a minor proportion based on the weight of metal powder present, is mixed with the slurry, which is then stirred or agitated. It is found that by such treatment the electrical resistance of the metal pigment is sufficiently increased to permit its use without restriction as the metallic ingredient in a paint that is desired to be applied by electrostatic spraying. Further, it is found that the increase in electrical resistance is effected by the described treatment without detracting from the functional properties (i.e. effectiveness, and suitability for use as, pigment) of the untreated metal flake pigment.

It is presently believed that this increase in electrical resistance of the pigment is attributable to the establishment on the metal powder of an electrically insulating surface coating of polymerized n-(trimethoxysilylpropyl) ethylenediamine, it being further believed that the polymerization occurs as the silane is stirred in the slurry of metal powder owing to the presence of water in the slurry. To promote polymerization, a small quantity of water may be added to the slurry, but this may not be essential to the attainment of the desired results, apparently because sufficient water to effect the polymerization is present in the slurry presumably owing to moisture in the atmosphere or in, on or around the metallic pigment.

The materials to which the method of the present invention is applied are, as stated, metal pigments, i.e. flake metal powders. The nature and properties of such pigments, as also methods for preparing them, are well-known in the art and accordingly need not be described in detail, it being understood that the invention in a broad sense has application to metal pigments however produced. Stated generally, flake metal powders are commonly made by grinding finely divided metal, such as foil scrap or atomized powder, into the desired flake form (ordinarily of very fine particle size, e.g. —325 mesh particle size), either under dry conditions, as in air or other gas, or wet in some liquid such as mineral spirits. In both wet and dry grinding operations, it is conventional to perform the grinding or milling step in the presence of a small amount of a grinding agent, of which illustrative examples are fatty acids such as stearic acid and oleic acid; the grinding agent acts to protect the metal particles during grinding, so that they are flattened into the desired flake form rather than merely being broken up, and to prevent cold welding of the particles. In addition, the grinding agent commonly coats the particles with a thin film, which may be left on the particles after grinding and may serve to impart corrosion resistance and/or other properties, such as leafing, to the flake pigment, it being understood, however, that both leafing and non-leafing flake powders may be produced in the manner described above by appropriate selection of process conditions as will be apparent to those skilled in the art.

As will be appreciated from the foregoing, the metal powder treated by the method of the present invention, having already been subjected to flake-forming operation as described above, ordinarily has a pre-existing surface coating of grinding agent residue. The present method is, as stated, broadly applicable to the treatment of such flake powders, whatever residue may be on the untreated flake from grinding, and regardless of whether the untreated flake is leafing or non-leafing in character. The product of the invention, prepared by the described method, is a metal powder having (i.e. ordinarily in addition to such pre-existing coating) a surface coating of polymerized n-(trimethoxysilylpropyl)ethylenediamine.

Among specific examples of fields in which the products of the invention (e.g. aluminum pigments) have particular use, as pigment in a paint or like vehicle for application by electrostatic spraying, are industrial finishing and maintenance painting for protective and/or decorative purposes. The present treatment affords such pigments having electrical resistance sufficiently high to enable their application by electrostatic spraying in paints containing much more metal pigment than is possible when using untreated pigment, as desired especially for certain maintenance painting purposes where high pigment concentrations are important to assure adequate protection of the painted surface.

By way of specific illustration, the method and product of the invention will be further described below with reference to the treatment of a conventional non-leafing aluminum pigment prepared by grinding aluminum powder in mineral spirits in the presence of oleic acid. This powder is conventionally prepared and used in the form of an aluminum paste, i.e. a paste of the metal powder with a liquid such as mineral spirits, for example having an aluminum content of the order of about 65%.

In accordance with the present method, the described non-leafing aluminum powder (having a surface coating from oleic acid grinding) in paste form is established in a slurry in hydrocarbon solvent, e.g. mineral spirits. The n - (trimethoxysilylpropyl)ethylenediamine (in liquid form) is added to the slurry in an amount equal to a minor proportion of the weight of aluminum powder present. A presently preferred range of proportions of silane used is between about 1% and about 5% of the weight of aluminum powder, although higher or lower proportions can be employed if desired; it is found in particular that use of the silane in a proportion of about 3% of the weight of aluminum present gives highly effective results, increasing the breakdown voltage of the treated aluminum pigments from about 20,000 volts to above 50,000 volts.

To avoid premature polymerization, the silane should be kept from exposure to water prior to introduction to the slurry. A minor proportion of water may, if desired, be added to the slurry to promote polymerization of the silane. Very preferably, the water if added should be in a proportion sufficiently small to be completely consumed by the polymerization reaction since it is regarded as highly undesirable to have water present in aluminum paste pigments owing to the danger of deterioration when water is in the paste; present-day industrial requirements for aluminum paste specify a maximum water content of not more than about $\frac{1}{10}\%$ in aluminum paste pigment. As stated above, however, it is not essential that water be added to the slurry, it being found that the desired increase in resistance can be achieved very effectively even when no water is supplied, for the reason (as presently believed) that moisture in the atmosphere or in, on or around the aluminum paste provides sufficient available moisture to achieve effective polymerization.

After addition of the silane to the slurry (with or without water), the slurry is stirred or agitated for a period of time sufficient to cause the silane to polymerize on the surface of the flake aluminum particles (this reaction consuming water from the slurry) so as to establish an insulating coating of polymerized silane on the particles. In specific instances of operation, it has been found that a period of stirring of from nine to twelve hours is sufficient to accomplish this result; in general, a longer time period is used when no water is added to the slurry than when supplemental water is present.

Upon completion of the stirring or agitation step, the aluminum pigment is conveniently restored to paste form by removal of the excess mineral spirits in any suitable manner and may then be used as a pigment in paint or other coating compositions for application by electrostatic spraying. It is found that the breakdown voltage of the pigment product thus produced is satisfactorily above the 50,000 volt requirement previously mentioned; in specific instances, breakdown voltages of 85,000 volts have been achieved in the present method without addition of water and breakdown voltages of 55,000 volts have been achieved with addition of a minor proportion of water. This increase in breakdown voltage is attained without loss of the functional properties of the aluminum paste as a pigment.

The pigment product of the foregoing treatment is, as stated, believed to bear a surface coating of polymerized silane (in addition to the pre-existing coating from oleic acid grinding), in the light of observation and tests.

As further evidence that polymerization of the silane occurs in the present method, it is found that when a quantity of the silane is placed in a container of mineral spirits and stirred with no aluminum pigment present, a visible coating develops on the internal surface of the container and on the stirrer and that this coating develops more rapidly when a small amount of water is added to the mineral spirits than when no water is present. No such coating is observed when aluminum pigment is present in the mineral spirits, however, indicating that in such case the polymerized silane is deposited on the surfaces of the pigment particles.

While the method of the invention has been described above with particular reference to the treatment of non-leafing aluminum paste pigments, it will be appreciated that the invention in a broad sense is also applicable to the treatment of other metal pigments, including leafing aluminum pigments and pigments (leafing or non-leafing) of other metals such as gold bronze, gold, iron, stainless steel, nickel, tin, chromium, lead and bismuth flake powders as well as flake powders of various alloys of these metals.

For further illustration of the method and product of the invention, reference may be had to the specific examples set forth below. The values of breakdown voltage set forth in these examples, as also the values referred to above, were determined by the following testing procedure:

A typical industrial finishing vehicle is reduced in viscosity to 30 sec. #2 Zahn Cup at 77° F. by addition of xylol (i.e. xylene), and this mixture is further reduced to 20 sec. #2 Zahn Cup at 77° F. by addition of methyl Cellosolve (i.e. ethylene glycol monomethyl ether) in a proportion of 75 cc. methyl Cellosolve to 450 cc. of the mixture. To the resultant vehicle there is added the metal pigment to be tested, in a proportion (for the tests providing the measurements herein set forth) of 6 oz. pigment per gallon of paint. After thorough shaking, the pigment-containing mixture is caused to flow through a ¼ inch-outside diameter nylon tube at a rate of 150 cc. per minute. Within this tube (which is surrounded concentrically by an outer, oil-filled Lucite tube) are positioned a pair of electrodes spaced six inches apart along the tube axis, i.e. in the direction of paint flow, the downstream electrode being connected to a suitable high-voltage DC source and the upstream electrode being grounded through a microammeter. A succession of constant voltages, each 10 kv. higher than the preceding voltage, are then applied while the paint is continuously circulated; each voltage value is applied for one minute with intervals of 30 seconds between successively applied voltages. Microammeter readings are taken 15 seconds and one minute after initiation of application of each voltage. When shorting through the paint occurs, the applied voltage is adjusted to determine within 5 kv. the value of voltage that can be maintained for one minute without shorting as determined by the microammeter readings.

Example I 100 grams of non-leafing flake aluminum pigment, prepared by grinding aluminum powder to flake form in mineral spirits in the presence of oleic acid as a grinding agent, and in the form of an aluminum paste (in mineral spirits) containing about 65% aluminum by weight, were mixed with 400 ml. mineral spirits to form a slurry. An amount of Dow-Corning Z–6020 silane [this being n - (trimethoxysilylpropyl) - ethylenediamine in liquid state] equal in weight to about 5% of the weight of aluminum powder present, was added, with stirring, to the slurry. In addition, water was added to the slurry in an amount of five drops per hundred grams of aluminum paste. Stirring was continued for a period of about 9½ hours.

The treated aluminum pigment was thereafter tested for breakdown voltage and was found to have a breakdown voltage of about 55,000 volts.

Example II

A further 100-gram quantity of the aluminum paste used as the starting material in Example I was established in a slurry with 400 ml. mineral spirits, as before, and Dow-Corning Z–6020 silane in an amount equal to about 5% of the weight of aluminum present, was added to the slurry, with stirring. No water was added to the slurry. Stirring was continued for a period of about 10½ hours.

The treated aluminum pigment was thereafter tested for breakdown voltage and was found to have a breakdown voltage of about 85,000 volts.

Example III

Another 100 g. quantity of the aluminum paste used as the starting material in Example I was established in a slurry with 400 ml. mineral spirits. Dow-Corning Z–6020 silane, in an amount equal to about 3% of the weight of aluminum present, was added to the slurry, with stirring; no water was added. Stirring was continued for about 11½ hours. The treated aluminum pigment, when tested, was found to have a breakdown voltage of about 65,000 volts.

Example IV

The procedure of Example III was repeated, again using Dow-Corning Z–6020 silane in an amount equal to about 3% of the weight of aluminum present, but four drops of water per 100 grams of aluminum paste were added to the slurry. In this instance stirring was continued for about ten hours. Upon testing, the treated aluminum pigment was found to have a breakdown voltage of about 40,000 volts.

Example V 100 grams of the aluminum paste used as a starting material in Example I was mixed with 400 ml. of mineral spirits to form a slurry. Dow-Corning Z–6020 silane in an amount equal to about 3% of the weight of aluminum present was added to the slurry with stirring; no water was added. Stirring was continued for about three hours. The treated aluminum pigment, when tested, was found to have a breakdown voltage of about 35,000 volts.

Example VI

To a slurry containing 100 grams of the aluminum paste used as a starting material in Example I in 400 ml. of mineral spirits, Dow-Corning Z–6020 silane was added, with stirring, in an amount equal to about 1% of the weight of aluminum, without addition of water; stirring was continued for about 9½ hours. The treated aluminum pigment was found to have a breakdown voltage between about 25,000 and about 30,000 volts.

Example VII

A 100 gram quantity of leafing aluminum flake pigment prepared by grinding aluminum powder to flake form in mineral spirits in the presence of stearic acid as a grinding agent, and in the form of an aluminum paste (in mineral spirits) containing about 65% aluminum by weight, was mixed with 400 ml. of mineral spirits to form a slurry. An amount of Dow-Corning Z–6020 silane equal to about 3% of the weight of aluminum present was added, with stirring; no water was added. Stirring was continued for about 11½ hours. The treated aluminum pigment had a breakdown voltage of about 25,000 volts and exhibited 25% leaf.

Example VIII 100 grams of dry flake copper powder was mixed with 400 ml. of mineral spirits to form a slurry, to which Dow-Corning Z–6020 silane was added in an amount equal to about 5% of the weight of copper, no water being added. Stirring was continued for about 11 hours. The treated copper powder had a breakdown voltage above 100,000 volts, and exhibited no leaf.

It is to be understood that the invention is not limited to the procedures and embodiments hereinabove specifically set forth but may be carried out in other ways without departure from its spirit.

I claim:
1. A method of treating a metal pigment constituted of flake metal powder, comprising establishing a slurry of said metal powder in hydrocarbon solvent, mixing therewith an amount of n-(trimethoxysilylpropyl) ethylenediamine equal to between about 1% and about 5% of the weight of metal powder in said slurry, and stirring said slurry for a period of time sufficient to establish on said metal powder an electrically insulating surface coating of polymerized n-(trimethoxysilylpropyl) ethylenediamine.

2. A method according to claim 1, including the step of adding to said slurry a minor proportion of water based on the weight of metal powder in said slurry to promote polymerization of said n-(trimethoxysilylpropyl) ethylenediamine in said slurry.

3. A method of treating an aluminum pigment constituted of flake aluminum powder, comprising establishing a slurry of said flake aluminum powder in hydrocarbon solvent, mixing therewith an amount of n-(trimethoxysilylpropyl) ethylenediamine equal to between about 1% and about 5% of the weight of aluminum powder in said slurry and stirring said slurry for a period of time sufficient to establish on said aluminum powder an electrically insulating surface coating of polymerized n-(trimethoxysilylpropyl) ethylenediamine.

4. A method of treating an aluminum pigment constituted of flake aluminum powder, comprising establishing a slurry of said aluminum powder in hydrocarbon solvent, mixing therewith an amount of n-(trimethoxysilylpropyl) ethylenediamine equal to between about 1% and about 5% of the weight of aluminum powder in said slurry and stirring said slurry for about 9 to about 12 hours to establish on said aluminum powder an electrically insulating surface coating of polymerized n-(trimethoxysilylpropyl) ethylenediamine.

5. A method according to claim 4 including the step of adding to said slurry a minor proportion of water based on the weight of aluminum powder in said slurry to promote polymerization of said n-(trimethoxysilylpropyl) ethylenediamine.

6. A method of treating an aluminum pigment constituted of non-leafing flake aluminum powder prepared by grinding aluminum powder to flake form in mineral spirits in the presence of oleic acid as a grinding agent, comprising establishing a slurry of said flake aluminum powder in mineral spirits, mixing therewith an amount of n-(trimethoxysilylpropyl) ethylenediamine equal to between about 1% and about 5% of the weight of aluminum powder in said slurry, adding to said slurry water in a minor proportion based on the weight of aluminum powder in said slurry, and stirring said slurry for about 9 to about 12 hours to establish on said aluminum powder an electrically insulating surface coating of polymerized n-(trimethoxysilylpropyl) ethylenediamine.

7. A metal pigment comprising a metal powder having thereon a surface coating of polymerized n-(trimethoxysilylpropyl) ethylenediamine in an amount equal to between about 1% and about 5% of the weight of said powder.

8. An aluminum pigment comprising flake aluminum powder having thereon a surface coating of polymerized n-(trimethoxysilylpropyl) ethylenediamine in an amount equal to between about 1% and about 5% of the weight of said powder.

9. A metal pigment comprising non-leafing flake aluminum powder produced by grinding aluminum powder to flake form in mineral spirits in the presence of oleic acid, and having thereon a surface coating of polymerized n-(trimethoxysilylpropyl) ethylenediamine in an amount equal to between about 1% and about 5% of the weight of said powder.

References Cited

UNITED STATES PATENTS

| | | | |
|---|---|---|---|
| 2,896,135 | 7/1959 | Briggs. | |
| 3,210,316 | 10/1965 | Merck et al. | 106—290 |
| 3,290,165 | 12/1966 | Iannicelli | 260—375 |

ALLAN LIEBERMAN, *Primary Examiner.*